US012398679B2

(12) United States Patent
Hanrahan et al.

(10) Patent No.: US 12,398,679 B2
(45) Date of Patent: Aug. 26, 2025

(54) TRANSMISSION AND METHOD FOR CONTROL OF BOOST SPOOL

(71) Applicant: RTX Corporation, Farmington, CT (US)

(72) Inventors: Paul R. Hanrahan, Sedona, AZ (US); Daniel B. Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/506,593

(22) Filed: Nov. 10, 2023

(65) Prior Publication Data

US 2024/0287939 A1  Aug. 29, 2024

Related U.S. Application Data

(62) Division of application No. 17/662,204, filed on May 5, 2022, now Pat. No. 11,976,598.

(51) Int. Cl.
*F02C 7/36* (2006.01)
*F02C 9/26* (2006.01)

(52) U.S. Cl.
CPC . *F02C 7/36* (2013.01); *F02C 9/26* (2013.01)

(58) Field of Classification Search
CPC .......... F02C 7/36; F02C 9/26; F05D 2220/32; F05D 2240/35; F05D 2260/4031
See application file for complete search history.

(56) References Cited

U.S. PATENT DOCUMENTS

| | | | |
|---|---|---|---|
| 3,368,352 A | 2/1968 | Hewson | |
| 3,677,012 A | 7/1972 | Batscha | |
| 4,147,024 A | 4/1979 | Moellmann | |
| 5,694,765 A | 12/1997 | Hield et al. | |
| 8,424,280 B2 | 4/2013 | Moore et al. | |
| 10,669,940 B2 | 6/2020 | Snape | |
| 10,914,234 B1 | 2/2021 | O'Flarity et al. | |

(Continued)

FOREIGN PATENT DOCUMENTS

| | | |
|---|---|---|
| DE | 3149761 A1 | 7/1982 |
| EP | 3543511 A1 | 9/2019 |

(Continued)

OTHER PUBLICATIONS

Extended European Search Report for EP Application No. 23171717.4, Dated Jul. 10, 2023, pp. 5.

(Continued)

*Primary Examiner* — Ehud Gartenberg
*Assistant Examiner* — Henry Ng
(74) *Attorney, Agent, or Firm* — Kinney & Lange, P.A.

(57) ABSTRACT

A gas turbine engine includes a first spool associated with a primary combustor, a second spool associated with a secondary combustor, and a third spool, each spool including a compressor and a turbine mounted to a shaft. A transmission and accessory gearing are enclosed within a housing of an accessory gearbox. The transmission rotationally couples the third spool to the second spool and accessory gearing. A method of operating the gas turbine engine includes supplying a first fuel flow rate to the primary combustor and supplying a second fuel flow rate to the secondary combustor within an intermediate speed range of the gas turbine engine.

11 Claims, 8 Drawing Sheets

(56) References Cited

U.S. PATENT DOCUMENTS

| | | |
|---|---|---|
| 10,995,673 B2 | 5/2021 | Suciu et al. |
| 11,143,142 B2 | 10/2021 | Hanrahan et al. |
| 11,193,425 B2 | 12/2021 | Hanrahan et al. |
| 11,560,233 B2 | 1/2023 | Dubreuil et al. |
| 2008/0245050 A1 | 10/2008 | Wollenweber |
| 2010/0170262 A1 | 7/2010 | Kaslusky et al. |
| 2010/0326085 A1 | 12/2010 | Veilleux |
| 2012/0119020 A1 | 5/2012 | Burns et al. |
| 2012/0119021 A1 | 5/2012 | Burns et al. |
| 2012/0216549 A1 | 8/2012 | Burns |
| 2013/0247539 A1 | 9/2013 | Hoppe |
| 2014/0260295 A1 | 9/2014 | Ullyott et al. |
| 2016/0053721 A1 | 2/2016 | Fletcher et al. |
| 2016/0186600 A1 | 6/2016 | Surace |
| 2017/0113808 A1 | 4/2017 | Bond |
| 2017/0218844 A1 | 8/2017 | Hanrahan et al. |
| 2017/0241336 A1 | 8/2017 | Jones et al. |
| 2017/0248081 A1 | 8/2017 | Roach et al. |
| 2017/0298826 A1 | 10/2017 | Ryznic et al. |
| 2018/0010476 A1 | 1/2018 | Brostmeyer et al. |
| 2018/0080383 A1 | 3/2018 | Snape |
| 2018/0156121 A1 | 6/2018 | Snape et al. |
| 2019/0063331 A1 | 2/2019 | Beauchesne-Martel et al. |
| 2019/0218977 A1 | 7/2019 | Muldoon |
| 2019/0368417 A1 | 12/2019 | Terwilliger et al. |
| 2020/0032702 A1 | 1/2020 | Kupratis et al. |
| 2020/0040848 A1 | 2/2020 | Hanrahan et al. |
| 2020/0056497 A1 | 2/2020 | Terwilliger et al. |
| 2020/0080495 A1 | 3/2020 | Leque et al. |
| 2020/0224592 A1 | 7/2020 | Snape |
| 2020/0263560 A1 | 8/2020 | Vesely et al. |
| 2020/0386188 A1 | 12/2020 | Kupratis et al. |
| 2020/0400078 A1 | 12/2020 | Hanrahan et al. |
| 2023/0340913 A1* | 10/2023 | Minas .................. B64D 37/30 |

FOREIGN PATENT DOCUMENTS

| | | |
|---|---|---|
| EP | 3772577 A1 | 2/2021 |
| WO | 2020257396 A1 | 12/2020 |

OTHER PUBLICATIONS

Extended European Search Report for EP Application No. 23171722.4, Dated Jul. 7, 2023, pp. 8.

Extended European Search Report for EP Application No. 23171724.0, Dated Sep. 11, 2023, pp. 8.

Extended European Search Report for EP Application No. 23171725.7, Dated Sep. 11, 2023, pp. 5.

Partial European Search Report for EP Application No. 23171720.8, Dated Jul. 12, 2023, pp. 14.

Extended European Search Report for EP Application No. 23171720.8, Dated Oct. 16, 2023, pp. 13.

\* cited by examiner

TRANSMISSION AND METHOD FOR CONTROL OF BOOST SPOOL

CROSS-REFERENCE TO RELATED APPLICATION(S)

This is a divisional of U.S. patent application Ser. No. 17/662,204, entitled "TRANSMISSION AND METHOD FOR CONTROL OF BOOST SPOOL," filed May 5, 2022.

BACKGROUND

The present disclosure relates generally to gas turbine engines and, more particularly, to gas turbine engines capable of operating in a high overall pressure ratio (OPR) mode and in a low OPR mode to adapt to the ambient conditions and to provide more efficient operation without exceeding thermal limits of the gas turbine engine.

The overall pressure ratio (OPR) is a measure of the total pressure rise in a gas turbine engine (i.e., a pressure ratio equal to the air pressure discharged from the last compressor stage and the ambient air pressure entering the engine). Generally speaking, as OPR increases, the thermodynamic efficiency of the gas turbine engine increases, enabling the engine to consume less fuel per unit of thrust (i.e., thrust specific fuel consumption or TSFC) than a corresponding engine with lower OPR. However, air temperatures within the gas turbine engine increase with increasing OPR and can produce temperatures within the compressor section and/or turbine section that exceed permissible material and structural limits. Furthermore, the maximum temperature within the compressor and the turbine increase as the ambient temperature increases, adding to the temperature increase associated with the OPR of the engine.

Conventionally, turbine temperatures are maintained within acceptable limits by limiting OPR to a ratio that produces acceptable turbine temperatures for worst case ambient conditions, typically, design conditions corresponding to hot day take-off. While this technique produces a gas turbine engine design that provides an acceptable compromise for a variety of operating conditions, limiting OPR for hot day take-off conditions produces a gas turbine engine that operates at less OPR than otherwise possible at cruise power, reducing engine efficiency when high efficiency, low fuel consumption operation is most advantageous to extend aircraft range or payload capacity.

SUMMARY

A gas turbine engine in accordance with an exemplary embodiment of this disclosure includes spool, a second spool, a third spool, an accessory gearbox, and a plurality of engine accessories. The first spool includes a first compressor and a first turbine mounted to a first shaft. The second spool includes a second compressor and a second turbine mounted to a second shaft. The third spool includes a third compressor and a third turbine mounted to a third shaft. The accessory gearbox encloses a transmission gearing and accessory gearing. Tower shaft rotationally couples the third spool and the transmission gearing. The transmission gearing rotationally coupling the third spool to the second spool and the accessory gearing.

A further embodiment of the gas turbine engine in accordance with this disclosure includes a primary combustor and a secondary combustor. The primary combustor is disposed between and communicates with the first compressor and the first turbine. The secondary combustor is disposed between and communicates with the second compressor and the second turbine.

A method of operating the foregoing gas turbine includes supplying a first fuel flow rate to the primary combustor contemporaneously with supplying a second fuel flow rate to the secondary combustor based on a power lever angle indicative of an intermediate power range of the gas turbine engine. The intermediate power range of the gas turbine engine is between a maximum continuous power level and a minimum continuous power level associated with an operational power range of the gas turbine engine.

DETAILED DESCRIPTION

As described herein, a gas turbine engine has a boost spool that can be selectively engaged to increase overall pressure ratio (OPR) during certain engine power levels (e.g., cruise power) while operating the gas turbine engine without the boost spool during other power levels (e.g., takeoff power). A transmission rotationally couples boost spool to a low pressure spool of the engine and/or to the accessory gearbox facilitating improved speed profiles for the accessory gearbox. With this arrangement, the gas turbine engine can operate within thermal limits when ambient conditions limit the OPR and can operate with greater engine efficiency when ambient temperatures are lower and permit higher OPR operation.

Figure 1:
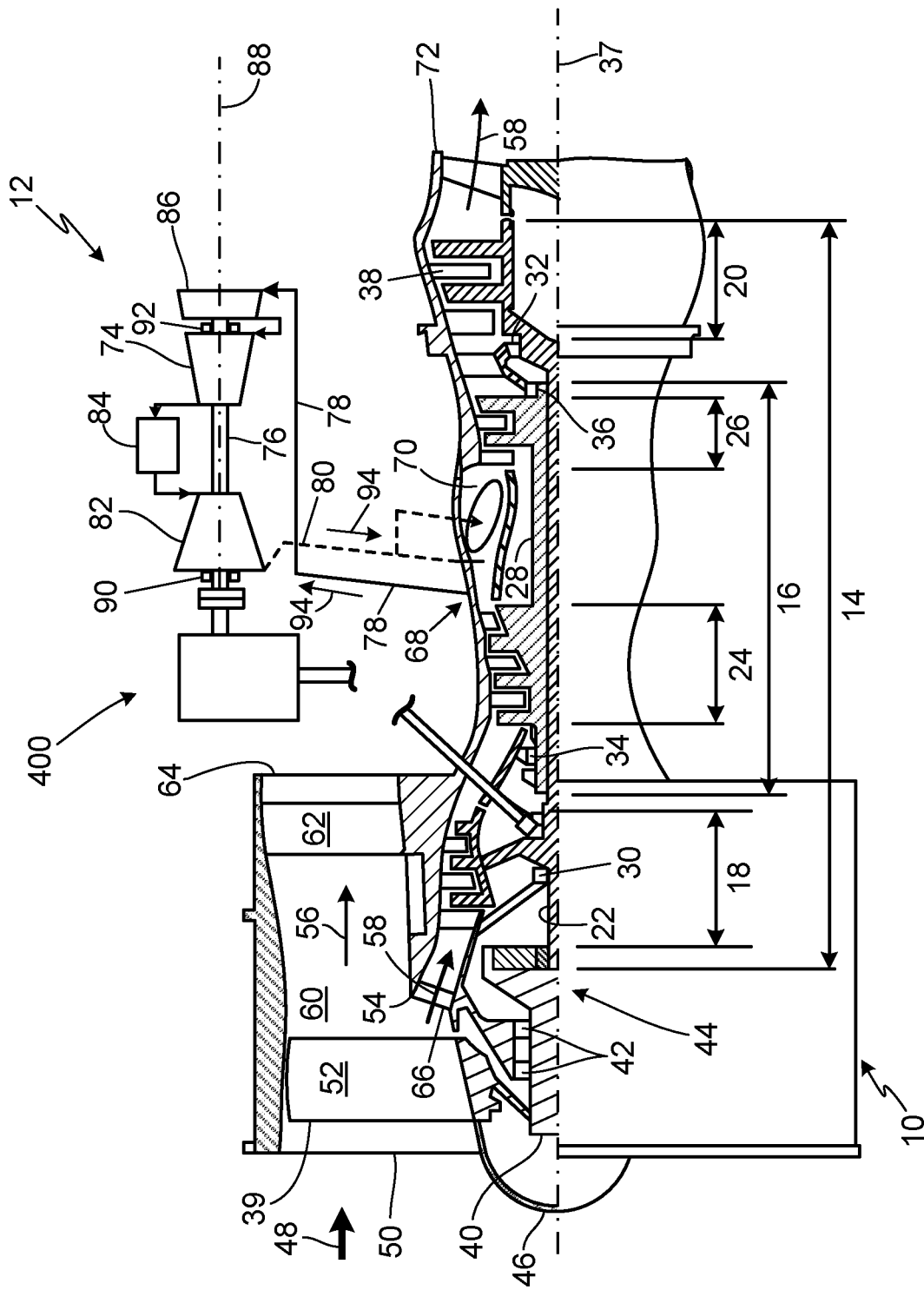
FIG. 1 is a schematic representation of a gas turbine engine that includes a boost spool.

FIG. 1 is a schematic representation of gas turbine engine 10 that includes boost spool 12 in accordance with an exemplary embodiment of this disclosure. Gas turbine engine 10 is a dual spool engine that includes low pressure spool 14 and high pressure spool 16. Low pressure spool 14 includes low pressure compressor 18 mechanically and rotationally connected to low pressure turbine 20 by shaft 22, and high pressure spool 16 includes high pressure compressor 24 mechanically and rotationally connected to high pressure turbine 26 by shaft 28. Bearings 30 and 32 support shaft 22 of low pressure spool 14, and bearings 34 and 36 support shaft 28 of high pressure spool 16, each at forward and aft shaft ends, respectively. Low pressure spool 14 and high pressure spool 16 are coaxial, each extending along and rotating about centerline 37 independently of one another.

Compressors and turbines 18, 20, 24, and 26 include at least one compressor stage or turbine stage, each stage formed by a row of stationary vanes and a row of rotating blades. In the exemplary embodiment depicted by FIG. 1, each of low pressure compressor 18 and high pressure compressor 24 has three stages, and each of low pressure turbine 20 and high pressure turbine 26 has two stages, although the number of stages in each compressor or turbine can be selected based on the desired pressure ratios as is known in the art.

At times, boost spool 12, low pressure spool 14, and high pressure spool 16 may be referred to as a first spool, a second spool, and/or a third spool in which "first", "second", and "third" correspond to one of boost spool 12, low pressure spool 14, and high pressure spool 16. Similarly, "first", "second", and/or "third" labels may be used in conjunction with corresponding components of the first spool, the second spool, and/or the third spool in order to distinguish components of each spool from components of the other spools.

As shown in FIG. 1, at least one vane stage of low pressure turbine 20 includes variable area turbine (VAT) 38. Variable area turbine 38 includes a row of vanes, each vane rotatable about a vane axis extending in a spanwise direction of the vane. The open area through variable area turbine (VAT) 38 changes depending on the stagger angle of vanes with respect to centerline 37. The closed position occurs when vanes form a maximum stagger angle with respect to centerline 37 while the open position occurs when vanes form a minimum, and sometimes negative, stagger angle with respect to centerline 37. The minimum open area typically coincides with the closed position since vanes tend to rotate toward each other, and in some instances vanes overlap when viewed along centerline 37. As vanes move from the closed position towards the open position, the open area through the vane stage increases until a maximum open area is reached, typically near a minimum turning angle, or zero stagger angle position. In some embodiments, the open position coincides with the vane position associated with a maximum open area through the vane row. In other embodiments, vanes can continue to rotate towards the open position in which the vane stagger angle is negative, tending to decrease the open area as the stagger angle becomes more negative. A neutral position or nominal position of vanes can be associated with an angular vane position between the open position and the closed position that achieve a desired incident angle with a rotor of low pressure turbine 20.

Gas turbine engine 10 also includes fan 39 mounted to fan shaft 40. One or more bearings 42 support fan shaft 40, which is mechanically and rotationally coupled to low pressure spool 14. Fan shaft 40 may be directly connected to shaft 22 of low pressure spool 14. With this arrangement, fan 39 and fan shaft 40 rotate at the same speed and in the same direction as low pressure spool 14. In other embodiments, such as the exemplary embodiment depicted in FIG. 1, fan shaft 40 may be rotationally coupled to shaft 22 via gearing 44. For instance, gearing 44 can be an epicyclic gear train that includes a central sun gear mounted to shaft 22, a ring gear mounted to fan shaft 40, and a plurality of plant gears circumferentially spaced about the sun gear and mechanically engaging the ring gear and the sun gear, the planet gears being supported by a planet carrier (not shown). Generally, gas turbine engines utilizing epicyclic gearing to drive fan 39 and fan shaft 40 restrain the planet carrier to cause fan shaft 40 to rotate slower (and in the opposite direction) than low pressure spool 14. Accordingly, fan 39 and low pressure spool 14 can rotate at speeds that are more efficient for respective blade geometries.

In operation, nose cone 46 guides ambient air flow 48 into inlet 50. Rotation of fan 39, which includes circumferentially spaced fan blades 52, compresses ambient air flow 48 before splitter 54 divides flow 48 into bypass flow 56 and core flow 58. Bypass flow 56 passes through bypass duct 60 to structural guide vanes 62 and discharges from engine 10 through a bypass flow exhaust nozzle (not shown), which is downstream from structural guide vane outlet 64. Inlet guide vanes 66 guide core flow 58 into low pressure compressor 18 that subsequently flows into high pressure compressor 24, each compressor stage further compressing core flow 58. Compressed core flow 58 discharges from high pressure compressor 24 into diffuser 68. Diffuser 68 fluidly connects high pressure compressor 24 to combustor 70 and includes divergent walls that reduce core flow 58 velocity and thereby increase static pressure of flow 58 before entering combustor 70. Combustor 70 can be an annular combustor (or another suitable design). Fuel injected into combustor 70 mixes with compressed core flow 58, and one or more ignitors combust the fuel-to-air mixture to produce a compressed and heated core flow 58 that is discharged into high pressure turbine 26. Core flow 58 interacts with vanes and blades of high pressure turbine 26 causing rotation of shaft 28 about centerline 37 and driving rotation of high pressure compressor 24. Similarly, core flow 58 interacting with vanes and blades of low pressure turbine 20 cause rotation of shaft 22 about centerline 37 to drive rotation of low pressure compressor 18 as well as fan shaft 40 directly or via gearing 44. Downstream of low pressure turbine 20, core flow 58 discharges from engine 10 through exhaust nozzle 72.

Figure 7:
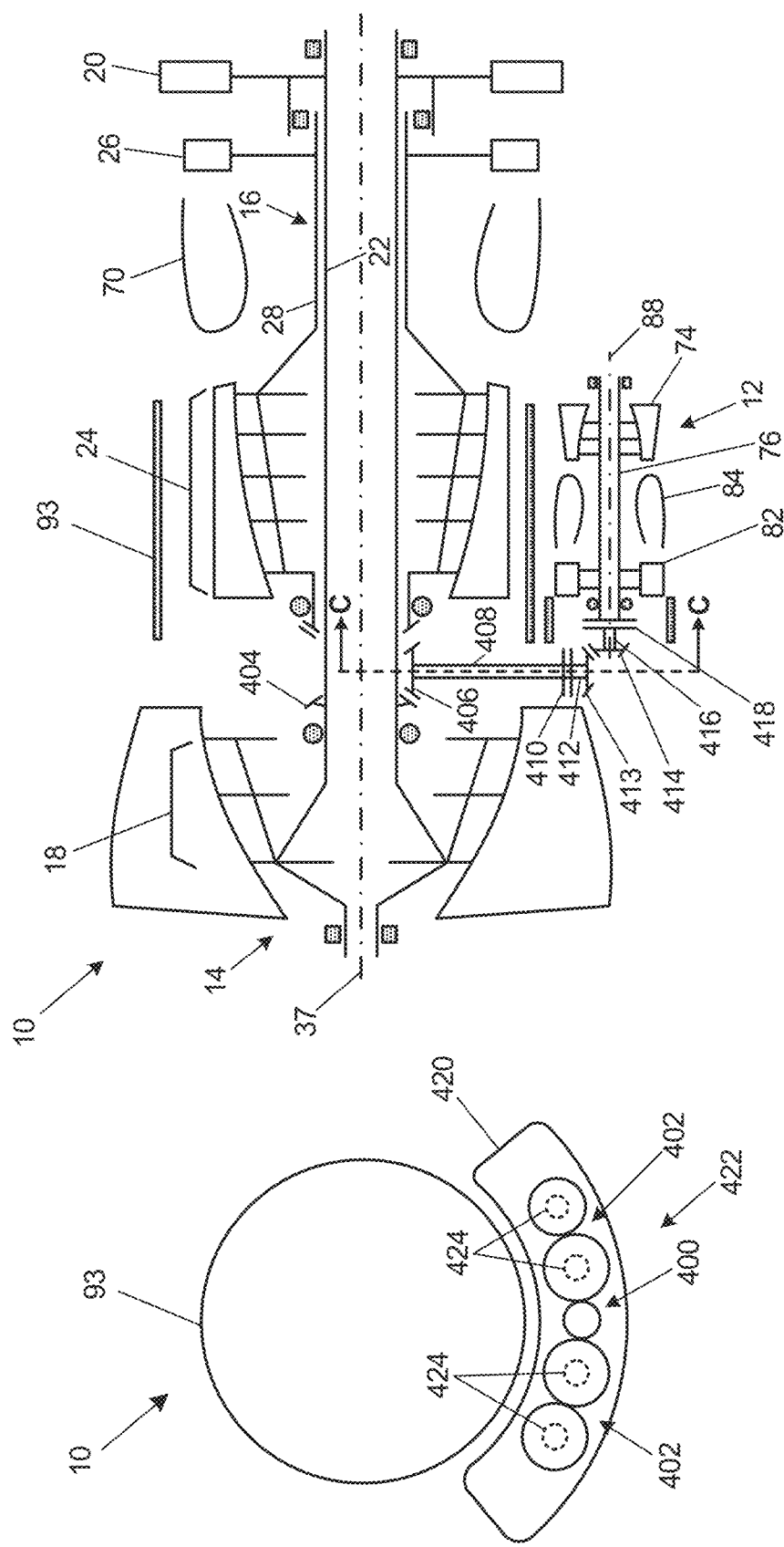
FIG. 7A and FIG. 7B are schematic of a transmission with multiple clutches for driving boost spool and accessory gearbox.

Boost spool 12 includes at least boost compressor 74 and shaft 76 fluidly connected to gas turbine engine 10 by inlet duct assembly 78 and outlet duct assembly 80. In some embodiments, boost spool 12 also includes one or more of boost turbine 82, combustor 84, and variable inlet guide vanes 86. Boost compressor 74 and boost turbine 82 include at least one compressor stage or turbine stage, each stage formed by a row of stationary vanes and a row of rotating blades. Variable inlet vanes 86 form an array of circumferentially spaced vanes at an inlet to boost spool 12 and upstream of boost compressor 74. Each vane of variable inlet guide vanes 86 is rotatable about a vane axis that extends in a spanwise direction of the vane. An angular position of variable inlet guide vanes 86 ranges between a closed position, a neutral or nominal position, and an open position in the same manner as vanes of variable area turbine 38. During operation of boost spool 12, variable inlet vanes 86 can pivot to decrease or increase the open inlet area in order to vary the amount of core flow 58 diverted into boost compressor 74 through inlet duct assembly 78. Shaft 76 mechanically and rotationally connects boost compressor 74 to boost turbine 82, each component arranged coaxially with boost axis 88. Bearings 90 and 92 support boost spool 12 with respect to a stationary casing, which may be affixed or incorporated to a casing of gas turbine engine 10 (e.g., casing 93 as depicted in FIGS. 7A and 7B). Transmission 400 mechanically and rotationally couples boost spool 12 to one or more spools of gas turbine engine 10 (e.g., low pressure spool 14 and/or high pressure spool 16) as discussed further below.

The position and orientation of boost spool 12 relative to gas turbine 10 is selected base on the particular details of the mechanical coupling to gas turbine engine 10. Boost axis 88 can be parallel and offset from centerline 37 of gas turbine engine 10 as schematically shown by FIG. 1. Furthermore, FIG. 1 shows boost spool 12 with a reverse flow orientation (i.e., aft-to-forward flow) such that a flow direction through boost spool 12 from compressor 74 to turbine 82 is opposite a flow direction (i.e., forward-to-aft flow) through gas turbine engine 10 from inlet 50 to outlet 64 and from inlet 50 to nozzle 72. Alternatively, boost axis 88 can be oblique or perpendicular to centerline 37.

For all mounting positions of boost spool 12, the location and orientation of boost spool 12 permits boost spool 12 to receive a compressed air flow from gas turbine engine 10 and to discharge an expanded air flow to gas turbine engine 10. Boost spool 12 can receive a compressed airflow from any compressor stage of gas turbine engine 10 to achieve varying degrees of boost compression. In one exemplary embodiment, boost spool 12 receives a compressed air flow from a location that is downstream from the last compressor stage of the gas turbine engine. In the case of gas turbine engine 10, boost spool 12 receives airflow from diffuser 68 and discharges an expanded airflow to diffuser 68. In other instance, boost spool receives airflow from diffuser 68 and discharges an expanded airfoil to both diffuser 68 and combustor 70, which is downstream of high pressure compressor 24 and upstream from high pressure turbine 26.

In operation, boost spool 12 receives a portion of core flow 58 extracted from diffuser 68 (i.e., boost flow 94) and routed to an inlet of boost compressor 74 through inlet duct assembly 78. Within boost compressor 74, the pressure and temperature of boost flow increases with each compressor stage. Compressed boost flow 94 enters combustor 84 where injected fuel mixes with compressed boost flow 94. Once the fuel-air mixture is ignited, boost flow 94 discharges into boost turbine 82. Turbine 82 expands boost flow 94 across each turbine stage, driving turbine 82, shaft 76, and compressor 74. Expanded boost flow 94 discharges from boost spool 12 through outlet duct assembly 80, which may route discharged air to diffuser 68, combustor 70, or both diffuser 68 and combustor 70.

Figure 2:
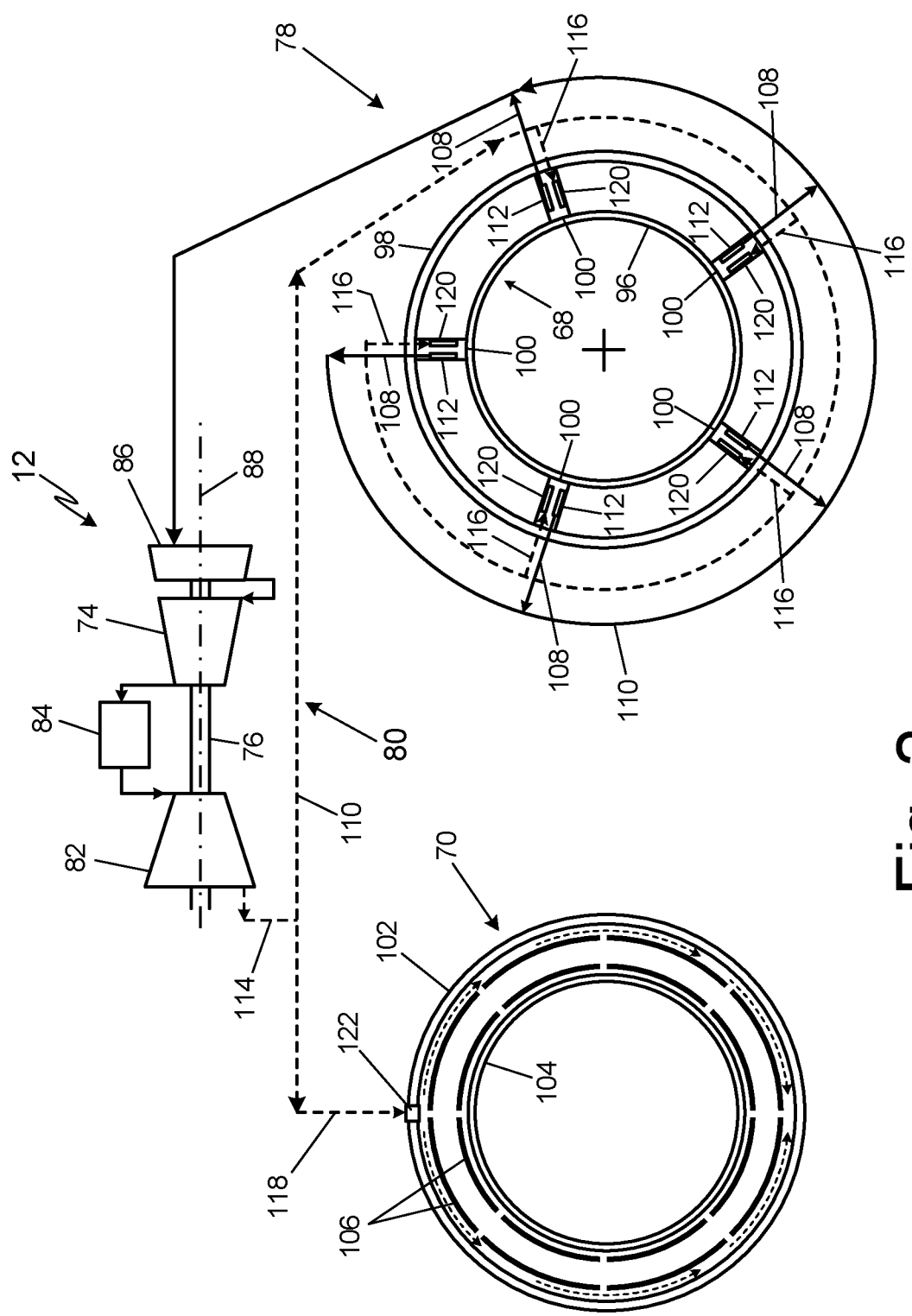
FIG. 2 is a schematic depicting inlet and outlet duct assemblies for the boost spool

FIG. 2 schematically depicts inlet duct assembly 78 that extracts a portion of core flow 58 from diffuser 68 and outlet duct assembly 80 that discharges the boost flow to diffuser 68 and combustor 70. As shown, diffuser 68 includes inner peripheral wall 96 and outer peripheral wall 98 spaced radially outward from wall 96. Multiple struts 100 extend from inner peripheral wall 96 to outer peripheral wall 98 of diffuser. FIG. 2 depicts five struts 100. However more or less struts 100 can be used in other examples, each incorporating features of inlet duct assembly 78 and outlet duct assembly 80 discussed below. Combustor 70 includes outer casing 102 and spaced radially from inner casing 104 to define an annular combustion chamber. Inner casing 104 and outer casing 102 are thermally protected by segmented liners 106.

Depicted using solid lines, inlet duct assembly 78 includes multiple branch ducts 108 collected into inlet manifold 110. Each branch duct 108 communicates with diffuser 68 via respective branch inlets 112. In some embodiments, branch inlets 112 can be formed by inner and/or outer peripheral walls of diffuser 68 such that branch ducts 108 extract core flow 58 through inner and outer walls of diffuser 68. In other embodiments, branch inlets 112 are formed by respective struts 100. Branch inlet ducts 108 extend from branch inlets 112 to inlet manifold 110. Inlet manifold 110 can be a pipe, duct, or plenum accommodating the collected flow through each branch inlet duct 108 and routing the accumulated inlet flow to inlet of boost spool 12.

Depicted using dashed lines, outlet duct assembly 80 can include one or more ducts extending from an outlet of boost turbine 82 to diffuser 68, combustor 70, or both diffuser 68 and combustor 70. In one exemplary embodiment, outlet duct assembly 80 can include main duct 114 extending from an outlet of boost turbine 82 to one or more branch outlet ducts 116, one or more branch outlet ducts 116, or one or more branch outlet ducts 116 and one or more branch outlet ducts 118. Each branch outlet duct 116 extends from main duct 114 to one of boost outlets 120 formed in an inner peripheral wall or an outer peripheral wall of diffuser 68, or a wall of strut 104, placing main duct 114 and boost turbine 82 in communication with diffuser 68. Each branch outlet duct 118 extends from main duct 114 to one of boost outlets 122 formed in a peripheral wall of combustor 70, placing main duct 114 and boost turbine 82 in communication with combustor 70.

As shown in FIG. 2, outlet duct assembly 80 includes main duct 114, multiple branch ducts 116, and branch duct 118. Main duct 114 extends from boost turbine 82 to each branch outlet duct 116 and branch duct 118. Branch outlet ducts 116 extend from main duct 114 to boost outlets 120 formed in walls of respective struts 100. Branch outlet duct 118 extends from main duct 114 to boost outlet 122 formed in a peripheral wall bounding a combustion zone of combustor 70.

Figure 3:
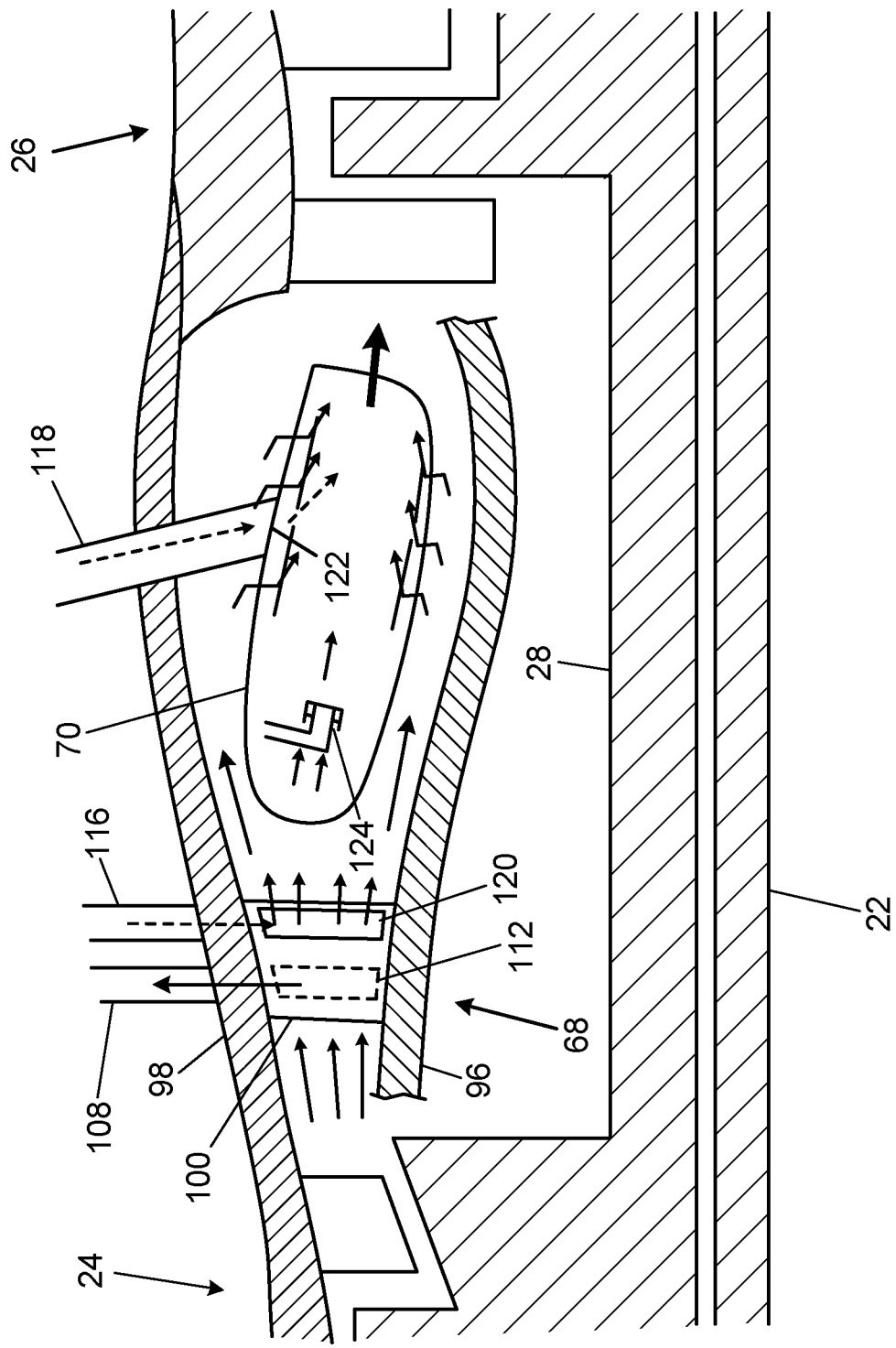
FIG. 3 is a schematic depicting diffuser and primary combustor of the gas turbine engine.

FIG. 3 is a schematic of diffuser 68 and combustor 70 of gas turbine engine 10. As shown, branch inlet duct 108 extracts air from core flow 58 through inlet 112, and branch duct 116 discharges boost exhaust flow through outlet 120. Branch inlets 112 and branch outlets 120 are formed by strut 100. One or both of branch inlet 112 and branch outlet 120 can extend from inner peripheral wall 96 to outer peripheral wall 98. Outlet 122 of branch outlet duct 118 discharges through outer casing of combustor 70. The location of outlet 122 is spaced axially downstream from injectors 124, or between injectors 124 and high pressure turbine 26.

Figure 4:
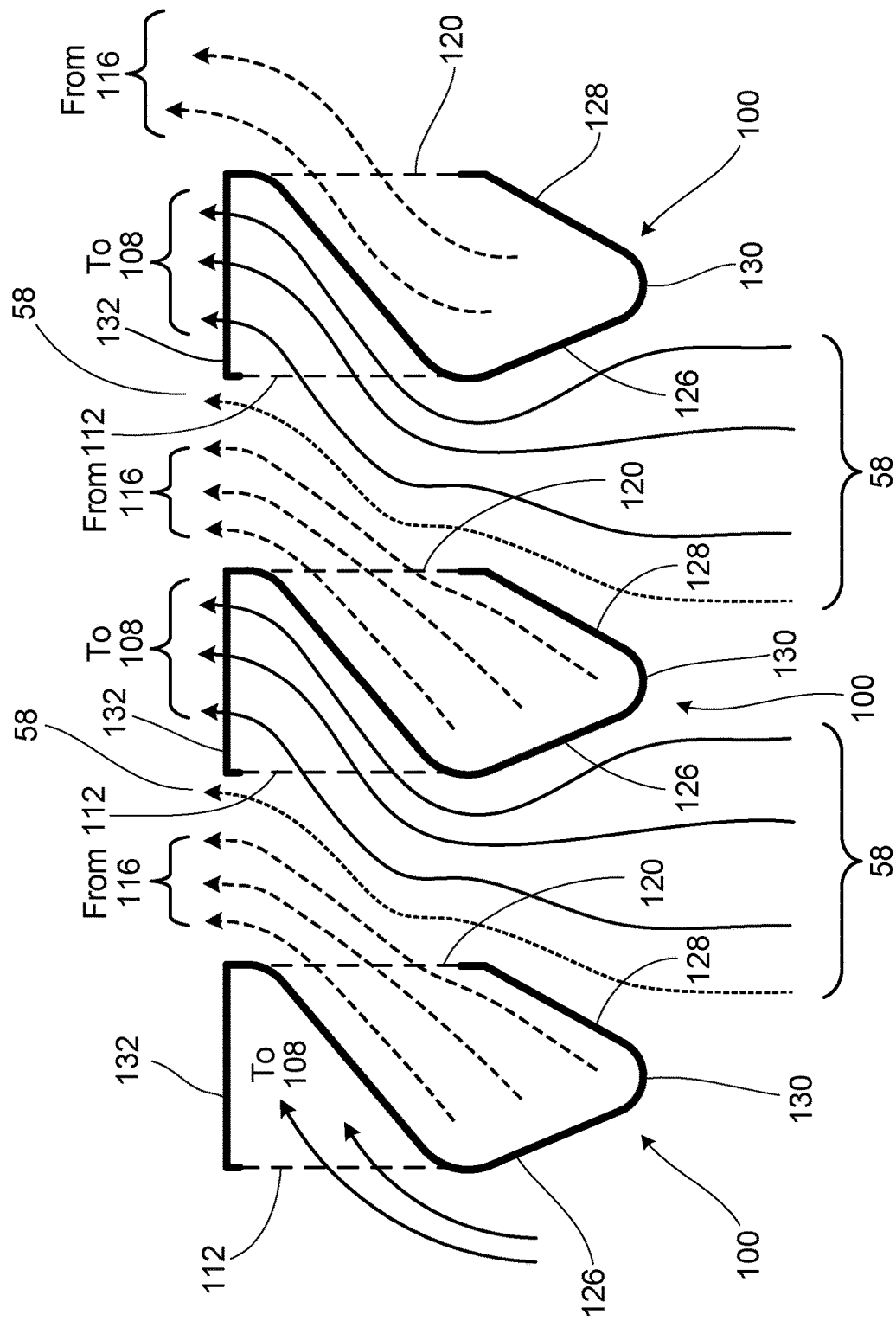
FIG. 4 is schematic of diffuser inlet and outlet areas of the inlet and outlet duct assemblies.

FIG. 4 depicts another schematic view of struts 100 and the flow distribution within diffuser 68. Each strut 100 includes first side wall 126 and second side wall 128 extending from leading edge 130 of strut 100 to rear wall 132. Inlets 112 are disposed in one of sidewalls 126 and 128 while outlets 120 are disposed in the other sidewall opposite the inlet sidewall. During operation of boost spool 12, a portion of compressed core flow 58 enters each inlet 112 and flows through branch inlet ducts 108 and manifold 12 to the inlet of boost spool 12 and boost compressor 74. A portion of boost spool flow exiting boost turbine 82 flows through each branch outlet duct 116 before discharging through each outlet 120 into diffuser 68.

An outlet flow division can be achieved with appropriate selection of length, cross-sectional area, and routing of main duct 114, diffuser branch ducts 116, combustor branch duct 118 and associated outlets 120 and 122 of outlet duct assembly 80. A minimum mass flow rate of boost exhaust discharged to diffuser through outlets 120 relates to an amount of flow required to maintain flow into boost spool 12 through inlet duct assembly 78. Adequate flow through inlet duct assembly 78 can be achieved by maintaining at least a minimum static pressure at branch inlets 112 throughout all operating conditions during which boost spool 12 can be operated, including transient periods associated with starting or stopping boost spool 12. The maximum mass flow rate of boost exhaust discharged to diffuser 68 through outlets 120 relates to a maximum temperature of fuel injectors within combustor 70. As boost exhaust mass flow rate increases, a temperature of compressed air entering combustor 70 increases. Accordingly, the maximum permitted temperatures of components of combustor 70 during continuous operation limits the maximum mas flow rate of boost exhaust returned to diffuser 68 through outlets 120. Expressed as a percentage of total flow through boost spool 12, five percent to forty percent of boost exhaust flow can be discharged into diffuser 68 while the remainder ninety-five percent to sixty percent of boost exhaust flow can be discharged to combustor 70.

The flow division of boost exhaust between diffuser 68 and combustor 70 allows boost outlets 120 to extend from the inner peripheral wall to the outer peripheral wall of diffuser 68 as shown in FIG. 3. As the radial extent of boost outlets 120 approaches the full radial extent of diffuser 68 at struts 100, flow uniformity and flow stability increase within diffuser 68 while component temperatures within combustor 70 remain acceptable for continuous operation.

Figure 5:
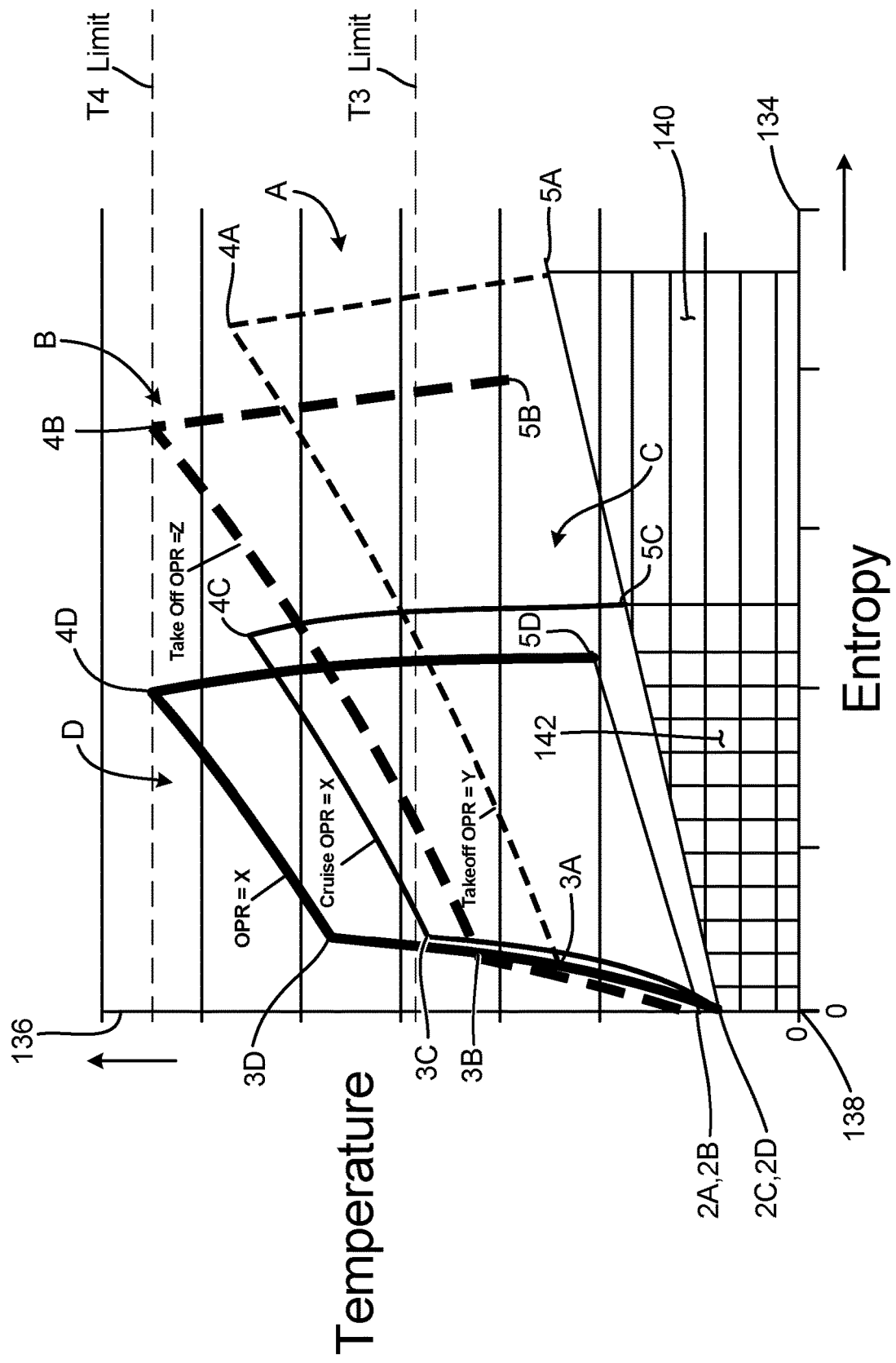
FIG. 5 is a T-s diagram illustrating the thermodynamic performance of a gas turbine engine operating with a boost spool relative to a gas turbine engine operating without a boost spool.

FIG. 5 is a T-s diagram illustrating the thermodynamic performance of gas turbine engine 10 boosted by spool 12 relative to gas turbine engine 10 operating without boost spool 12. Entropy is displayed along abscissa axis 134, and temperature is displayed along ordinate axis 136, each increasing from origin 138. Dashed curve A depicts the preferred thermodynamic cycle of gas turbine engine 10 operating without boost engaged at takeoff power. Dashed curve B depicts the thermodynamic cycle of gas turbine engine 10 were boost to be engaged while operating at takeoff power on a hot day. Solid curve C depicts gas turbine engine 10 operating without boost spool 12 engaged while operating at cruise power. Solid curve D depicts the preferred thermodynamic cycle of gas turbine engine 10 operating with boost engaged while operating at cruise power having an OPR (value=X) that is greater than the OPR of boosted gas turbine engine 10 were boost to be engaged while operating at takeoff power on a hot day.

Each of curves A, B, C, and D are defined by points 2, 3, 4, and 5, respectively. Accordingly, dashed curve A extends from point 2A to point 3A, representing the compression work completed by engine 10 between engine inlet 50 and the exit of high pressure compressor 24 (see FIG. 1). From point 3A, dashed curve A extends along a line of constant pressure ratio (value=Y) to point 4A that represents the heat added to core flow 58 through combustion. After combustion, high pressure turbine 26 and low pressure turbine 20 extract work from the heated and compressed core flow 58, a process represented by dashed line A between points 4A and 5A. Dashed curve B extends between point 2B to point 3B during the compression phase, between point 3B and 4B along a line of constant pressure ratio (value=Z) during combustion, and between point 4B and 5B during turbine expansion. Solid curves C and D are defined by points 2C, 3C, 4C, and 5C and points 2D, 3D, 4D, and 5D in a similar manner to curves A and B. An engine operating along curve A has less OPR (value Y) than an engine operating on any of the other curves (i.e., curves C and D having an OPR equal to value X and curve B having an OPR value equal to Z). Moreover, an engine operating on curves C and D have an OPR value X that is greater than an engine operating on curve B with an OPR value Z.

The temperature entering the compressor section of gas turbine engine 10 at cruise power is lower than the temperature entering the compressor section of gas turbine engine 10 at takeoff power because the ambient temperature at cruising altitude is lower than the ambient temperature during a hot day takeoff. For example, at cruising altitude, the ambient temperature can be approximately-26.1 degrees Celsius (or about-15 degrees Fahrenheit) while on a hot day takeoff, the ambient temperature can be approximately 46.1 degrees Celsius (or about 115 degrees Fahrenheit). For each curve, the temperature within the engine at points 3A, 3B, 3C, and 3D are limited to a line of constant temperature labeled "T3 Limit" while the temperature at points 4A, 4B, 4C, and 4D are limited to a line of constant temperature labeled "T4 Limit".

Unboosted operation of gas turbine engine 10 represented by dashed curve A trades engine fuel efficiency and engine materials life between temperature limits during a hot day takeoff and cruising. As a result, the OPR of unboosted operation of engine 10 is reduced by hot day takeoff conditions (i.e., the temperature at point 4A is lower than the temperature at 4B). The area bounded by dashed curve A and a line connecting points 5A and 2A represent the amount of work completed by engine 10 while operating at takeoff power and without boost spool 12 operation. The area bounded by dashed curve B and a line connecting points 5B and 2B represent the amount of work completed by engine 10 while operating at takeoff power and with boost spool 12 operation. The two areas are the same and the amounts of work completed by the engine at takeoff are the same. The amount of heat energy rejected by gas turbine engine 10 while operating in accordance with dashed curve A is shown by horizontally-hatched area 140. The thermodynamic efficiency of gas turbine engine 10 operating in accordance with dashed curve A is the work energy divided by the summation of work and rejected heat energy defined by curve A.

Contrastingly, the work performed by gas turbine engine 10 with the aid of boost spool 12 is bounded by curve D and a line extending between points 5D and 2D while the heat energy rejected by boosted gas turbine engine 10 operating at cruise power is shown by vertically-hatched area 142. Regions where areas 140 and 142 overlap appear as a square-hatched area. By comparing the sizes of work areas bounded by curves D and C relative to heat rejection areas 140 and 142, respectively, it is evident that work area D represents a larger percentage of the total area under curve D than corresponding areas under curve C. Accordingly, operating gas turbine engine 10 with boost spool 12 at cruise power results in more efficient thermodynamic operation and, thus, improved thrust specific fuel consumption (TSFC) than operating engine 10 without boost spool 12. Furthermore, a gas turbine engine with the same OPR as boost engine operation depicted by curve D does not have the improved engine fuel efficiency and same life of operation. As shown in FIG. 5 (i.e., the temperature at 4B is higher than the temperature 4A). As such, gas turbine engine 10 can be operated without boost spool 12 during hot day takeoff conditions (i.e., dashed curve A) and can be operated with boost spool 12 at cruise power (i.e., solid curve D) to achieve greater thermal efficiency at cruise power while satisfying thermal limits for hot day takeoff conditions.

Figure 6:
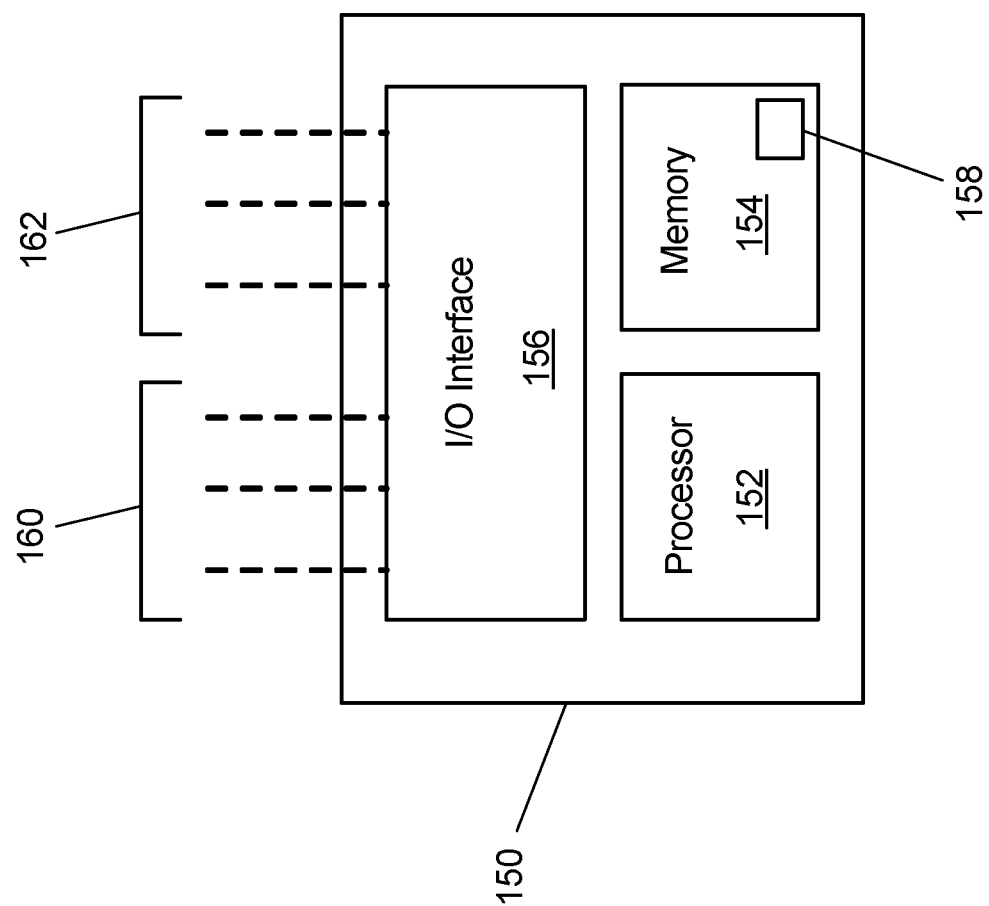
FIG. 6 is a schematic of a controller for the gas turbine engine.

FIG. 6 is a schematic of controller 150 that regulates the operation of gas turbine engine 10 and, more particularly, coupling and decoupling of boost spool 12 via one of transmission 400. Additionally, controller 150 regulates fuel flow rates to primary combustor 70 and secondary combustor 84 based on one or more engine parameters, aircraft parameters, and/or exterior conditions. Controller 150 can include a standalone control unit or a control module incorporated into another control unit. Furthermore, controller 150 can be an amalgamation of distinct control units and/or distinct control modules that together perform the functions described in this disclosure. In some embodiments, controller 150 can be a full authority digital engine control (FADEC), an electric engine controller (EEC), or an engine control unit (ECU).

Controller 150 includes processor 152, memory 154, and input/output interface 156. Processor 152 executes one or more control algorithms 158 stored within memory 154 to output engine control signals 160 based on one or more input signals 162. Examples of processor 152 can include any one or more of a microprocessor, a controller, a digital signal processor (DSP), an application specific integrated circuit (ASIC), a field-programmable gate array (FPGA), or other equivalent discrete or integrated logic circuitry.

Memory 154 can be configured to store information within controller 154. Memory 154, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Memory 154 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

Input/output interface or I/O interface 156 can be a series of input and output channels that electrically communicate with an engine control bus. The engine control bus interconnects controller 150 with various components of the gas turbine engine 10 described above such that engine control signals 160 can be transmitted to individual engine components and input signals 162 can be received.

Engine control signals 160, input signals 162, or both engine control signals 160 and input signals 162 can be an analog signal or a digital signal. For example, an analog signal can be a voltage that varies between a low voltage to a high voltage whereas digital signals can be a series of discrete voltage states distributed over a voltage range. Operatively, engine control signals 160 cause various components of gas turbine engine 10 to change state or position. For example, engine control signals 160 can be used to vary the position of one or more fuel valves to vary the fuel flow rate entering a combustor. Other examples of engine control signals 160 include signals associated with engagement or disengagement of clutches and an angular position of variable vane stages. Input signals 162 are representative of one of engine parameters, aircraft parameters, and environmental parameters. Exemplary engine parameters include rotational speed of a low pressure spool, high pressure spool, boost spool, and/or fan shaft, the state or position of fuel valves, bleed valves, the state or position of clutch assemblies, the temperature or pressure within the compressor, combustor, or turbine, and engine power. Aircraft parameters include various parameters associated with an aircraft such as power lever angle, altitude, pitch angle, yaw angle, roll angle, rate of climb, and airspeed, among other possible parameters. Exterior parameters include ambient temperature and pressure at the inlet of gas turbine engine 10.

FIG. 7A and FIG. 7B are schematic views depicting an exemplary embodiment of gas turbine engine 10 that includes transmission 400 rotationally coupling boost spool 12 and accessory gearing 402 to low pressure spool 14. FIG. 7B is a section view of gas turbine engine taken along line C-C in FIG. 7A. Transmission 400 includes shaft gear 404, inner tower gear 406, tower shaft 408, clutch 410, shaft 412, outer tower gear 412, boost gear 414, shaft 416, and clutch 418.

Shaft gear 404 mounts to shaft 22 of low pressure spool 14. Inner tower gear 406 mounts to tower shaft 408, which extends radially outward with respect to shaft 22 from inner tower gear 406 to clutch 410. Shaft gear 404 enmeshes with inner tower gear 406 to rotationally couple shaft 22 of low pressure spool 14 to tower shaft 408. Shaft 412 extends from clutch 410 to output gear 413. Boost gear 414 enmeshes with output gear 413 to rotationally couple shaft 412 to shaft 416. Shaft 416 extends from boost gear 414 to clutch 418. Boost shaft 76 extends along boost axis 88 to clutch 418.

Clutch 410 translates between an engaged state and a disengaged state to selectively couple tower shaft 408 to shaft 412. In an engaged state, clutch 410 rotationally couples tower shaft 408 to shaft 412 such that shaft 22 of low pressure spool 14 is rotationally coupled to output gear 413. In a disengaged state, clutch 410 rotationally uncouples tower shaft 408 from shaft 412 allowing shaft 22 of low pressure spool 14 to rotate independently of outer tower gear 412.

Clutch 418 translates between an engaged state and a disengaged state to selectively couple boost shaft 76 from boost gear 414. In the engaged state, clutch 418 rotationally couples boost shaft 76 to boost gear 414 such that boost gear 414 and shaft 76 rotate together. In the disengaged state, clutch 418 uncouples boost shaft 76 and boost gear 414 such that boost spool 12 can rotate independently from boost gear 414.

Accessory gearing 402 is rotationally coupled to outer tower gear 412 and/or boost gear 414. Accessory gearing 402 includes one or more gears enclosed within housing 420 of accessory gearbox 422 along with outer tower gear 412 and boost gear 414. One or more gears of accessory gearing 402 are driven by outer tower gear 412 or boost gear 414. At least some of the gears of accessory gearing 402 are rotationally coupled to respective output shafts 424. Each output shaft 424 drives an engine accessory (e.g., a fuel pump, generators, constant speed drives, lubricating oil pumps, hydraulic pumps, and engine starters).

Clutch 410 and clutch 418 can assume an engaged state or a disengaged state independently from the other. With clutch 410 engaged and clutch 418 disengaged, low pressure spool 14 drives accessory gearing 402 and, as such, provides power for engine accessories. Disengaging clutch 410 and engaging clutch 418 drives accessory gearing 402 and engine accessories with boost spool 12. When both clutches 410 and 418 are engaged, low pressure spool 14 and boost spool 12 drive accessory gearing 402 and engine accessories, and when both clutches 410 and 418 are disengaged, no power is provided to accessory gearing 402 and engine accessories.

Selective operation of boost spool 12 in concert with gas turbine engine 10 and transmission 400 depends on the operational range of gas turbine engine 10 input by power lever angle (PLA). The power lever angle (PLA) varies between zero percent (i.e., PLA 0) and one hundred percent (i.e., PLA 100). A power lever angle (PLA) equal to zero corresponds with an engine shutdown condition whereby fuel flow to combustor 70 stops and any remainder fuel is burned off or returned to fuel tanks of the aircraft. In order of increasing power level, intermediate power lever angles include engine start, ground idle and/or flight idle, a reduced cruising power level associated with loiter, cruise, and climb. A power lever angle (PLA) equal to one hundred percent corresponds to takeoff power. While power lever angle (PLA) values can be engine and/or aircraft dependent, exemplary power lever angle (PLA) values can be shutdown (PLA=0), engine start (0<PLA<5), ground idle and/or flight idle (5≤ PLA≤10), loiter (30≤ PLA≤40), cruise (40≤ PLA≤60), climb (70≤ PLA≤90), and takeoff (PLA=100).

Based on power lever angle (PLA) and one or more additional engine parameters, aircraft parameters, and/or external parameters, controller 150 transmits control signals to components of transmission 400 as well as fuel system components regulating fuel flows to combustor 70 (i.e., a primary combustor) and combustor 84 (i.e., a secondary combustor) to operate gas turbine engine 10 as described in the following scenarios.

Within the operational power range, gas turbine engine 10 includes a minimum continuous power level and a maximum continuous power level. The minimum continuous power level and the maximum continuous power level correspond to the minimum and maximum power levels at which gas turbine engine 10 can operate continuously and in which pressure and temperature at various locations within the engine stabilize. For example, the minimum continuous power level can correspond to the ground idle condition while the maximum continuous power level can correspond to the takeoff conditions.

Boost spool 12 operates within an intermediate power range of gas turbine engine 10. The intermediate power range is a subset of sequential power levels of gas turbine engine 10 bound by a minimum power level and a maximum power level. The minimum power level of intermediate power range may coincide with power lever angles (PLA) corresponding to engine start, ground idle, flight idle, loiter, cruise, or a power level between engine start and cruise. The maximum power level of intermediate power range may coincide with power lever angles (PLA) corresponding to cruise, climb, takeoff, or a power level condition between cruise and takeoff power.

In some embodiments, the intermediate power range can be further divided into two or more power subranges. For instance, sequentially continuous low power subrange and high power subrange can define the intermediate power range. The low power subrange extends from the minimum power level of intermediate power range to an intermediate power level greater than the minimum power level and less than the maximum power level of intermediate power range. The high power subrange extends from the intermediate power level to the maximum power level of the intermediate power range.

Table 1 describes the operational range of gas turbine engine 10 equipped with transmission 400. In this configuration, the intermediate power range extends to include the cruise condition and includes at least two power subranges. For example, the intermediate power range can extend from ground idle power corresponding to approximately ten percent power level angle (PLA=10) to cruise power corresponding to approximately sixty percent power level angle (PLA=60). Low power subrange extends from ground idle power to loiter power corresponding to approximately forty percent power lever angle (PLA=40). High power subrange extends from loiter power to cruise power.

At the engine start condition and up to ground idle power, controller 150 varies the fuel flow rate delivered to primary combustor 70 based on maintaining a minimum engine pressure ratio (EPRmin), or the ratio of exhaust pressure to inlet pressure. At the same time, controller 150 varies the fuel flow rate delivered to secondary combustor 84 based on a rotational speed of accessory gearbox 422. Clutch 418 is engaged, rotationally coupling boost spool 12 to accessory gearbox 422, and clutch 410 is disengaged, rotationally uncoupling low pressure spool 14 from accessory gearbox 422. Variable area turbine 38 are commanded to or towards an open position, increasing the open area through variable area turbine 38 relative to the nominal or closed positions.

As power level increases past ground idle power and up to loiter power, controller 150 supplies fuel to primary combustor 70 at a fuel flow rate varying as a function of the power lever angle (PLA). Secondary combustor 84 receives fuel at a rate that varies based on the rotational speed of the accessory gearbox 422 and in response controller 150. Boost spool 12 continues to drive accessory gearbox 422 via clutch 418, which remains engaged. Clutch 410 remains disengaged and, consequently, low pressure spool 14 is rotationally uncoupled from accessory gearbox 422. Controller 150 moves variable turbine vanes to or towards a nominal position, decreasing the open area through variable area turbine 38 relative to the open position.

Between loiter power and cruise power, clutch 410 engages to rotationally couple low pressure spool to accessory gearbox. Within this power level range, controller 150 varies the fuel flow rate to primary combustor 70 based on a minimum engine pressure ratio (EPRmin) and varies the fuel flow rate to secondary combustor 84 based on the position of the power lever (PLA). Accordingly, the combined power delivered from low pressure spool 14 and boost spool 12 drive engine accessories attached to accessory gearbox. Controller 150 moves variable turbine vanes to or towards the open position increasing the open area through variable area turbine 38 relative to the nominal or closed position.

At power levels greater than cruise power and up to takeoff power, controller 150 varies a fuel flow rate to primary combustor 70 based on the position of the power lever (PLA). While operating between cruise power and takeoff power, controller 150 stops fuel flow to secondary combustor 84 and disengages clutch 418. As such, boost spool 12 is rotationally uncoupled from accessory gearbox and low pressure spool 14. In response to control signals from controller 150, variable turbine vanes move to or towards the nominal position.

Figure 8:
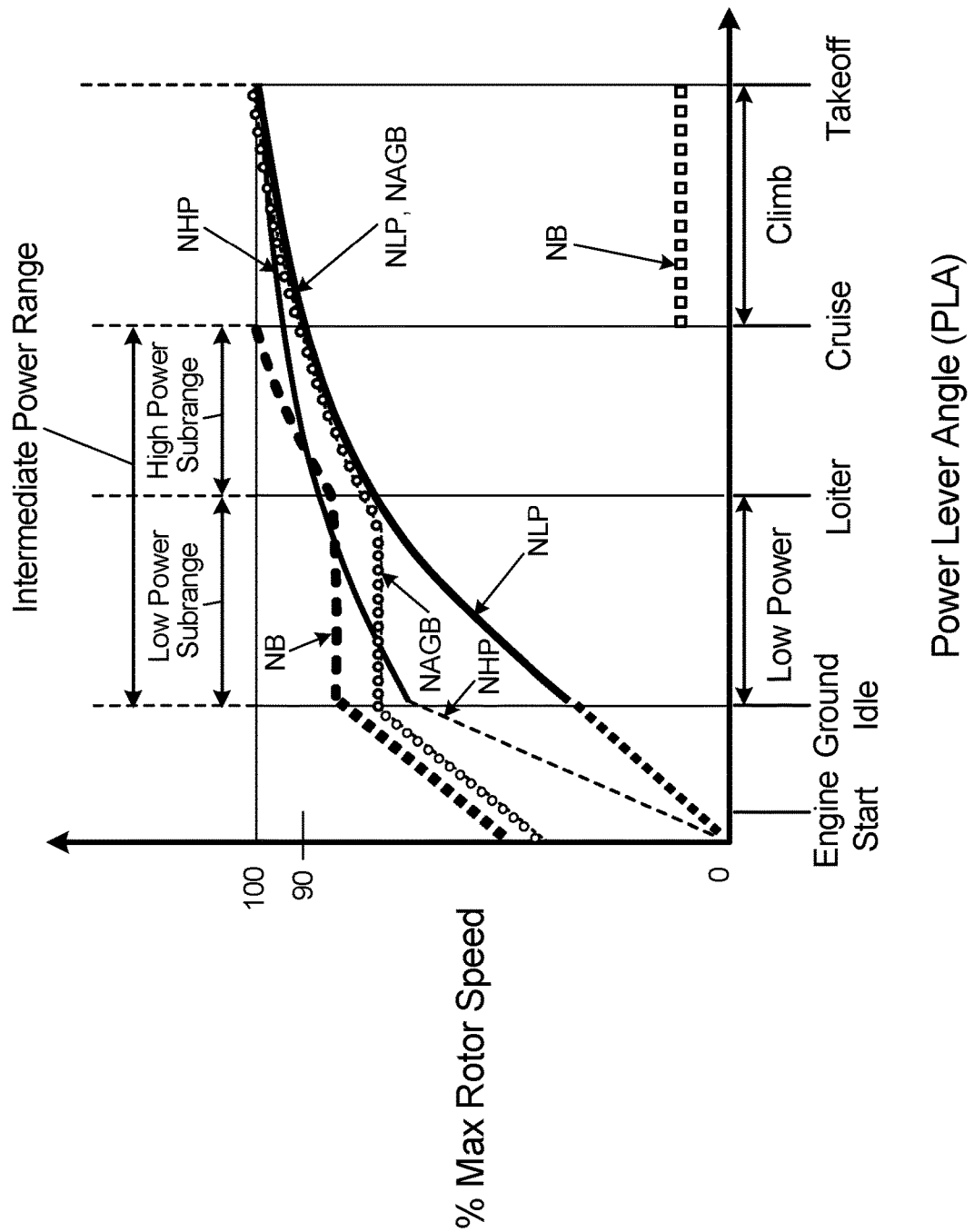
FIG. 8 is an exemplary speed profile for a gas turbine engine with a transmission in accordance with FIG. 7A and FIG. 7B.

FIG. 8 depicts an exemplary speed profile of gas turbine engine 10 equipped with transmission 400. As with the prior exemplary speed profiles, rotational speeds of high pressure spool 16 (NHP), low pressure spool 14 (NLP), boost spool 12 (NB), and the input of accessory gearbox 422 (NAGB) are expressed as a percentage of respective maximum opera-

TABLE 1

Operational Profile-Multiple Clutch Transmission

| Condition | PLA (% of Max) | Boost Clutch State | Tower Clutch State | Fuel Flow Primary Combustor | Fuel Flow Secondary Combustor | LP VAT |
|---|---|---|---|---|---|---|
| Start/Ground Idle | 0-5 | Engaged | Disengaged | f(EPRmin) | f(NAGB) | Open |
| Taxi/Low Power | 10-30 | Engaged | Disengaged | f(PLA) | f(NAGB) | Nominal |
| Loiter/Cruise | 40-60 | Engaged | Engaged | f(EPRmin) | f(PLA) | Open |
| Takeoff/Climb | 70-100 | Disengaged | Engaged | f(PLA) | None | Nominal | tional speeds of each spool or component. Dashed lines indicate starting, shutdown, or unpowered operation such as when a spool or component freewheels. Solid lines indicate operation of gas turbine engine 10 while delivering fuel to primary combustor 70, secondary combustor 84, or both primary and secondary combustors.

As shown, the rotational speed of accessory gearbox 422 (NAGB) remains constant within the low power subrange in proportion to the rotational speed of boost spool. This can be achieved by varying fuel flow deliver to secondary combustor 84 of boost spool 12 to maintain a constant speed, or to minimize speed variation between ground idle power and loiter power. Low pressure spool 14 (NLP) accelerates independently of boost spool between ground idle power and loiter power by disengaging clutch 410. At power levels greater than loiter power and up to cruise power, low pressure spool, boost spool, and accessory gearbox are coupled, respective speeds of each spool or component increasing in fixed relation as power lever angle increases. Between cruise power and takeoff power, low pressure spool operates without boost spool input. The gear ratio between boost spool 12 and low pressure spool 14 can be selected such that boost spool 12 attains its maximum operating speed when low pressure spool 14 attains approximately eighty percent to ninety percent of its maximum operating speed. Furthermore, the maximum operating speed of boost spool 12 coincides with the cruise condition and thereby provides increases the maximum overall pressure ratio (OPR) of gas turbine engine 10 during the longest phases of flight.

Discussion of Possible Embodiments

The following are non-exclusive descriptions of possible embodiments of the present invention.

A gas turbine engine according to an exemplary embodiment of this disclosure includes, among other possible things, a first spool, a second spool, a third spool, an accessory gearbox, a plurality of engine accessories, and a tower shaft. The first spool includes a first compressor and a first turbine mounted to a first shaft. The second spool includes a second compressor and a second turbine mounted to a second shaft. The third spool includes a third compressor and a third turbine mounted to a third shaft. The accessory gearbox includes a housing, a transmission gearing, a plurality of output shafts, and an accessory gearing rotationally coupled to the plurality of output shafts. The transmission gearing and the accessory gearing are enclosed with the housing. Each engine accessory of the plurality of engine accessories is rotationally coupled to one or the plurality of output shafts. The tower shaft includes an inner gear enmeshing with the shaft gear and extends radially outward from the third shaft to the transmission gearing. An outer gear of the tower shaft enmeshes with the transmission gearing. The transmission gearing enmeshes with the accessory gearing and rotationally couples the tower shaft to the second shaft.

The gas turbine of the preceding paragraph can optionally include, additionally and/or alternatively, any one or more of the following features, configurations, and/or additional components.

A further embodiment of the foregoing gas turbine engine can include a first clutch between the tower shaft and the transmission g earing.

A further embodiment of any of the foregoing gas turbine engines, wherein the first clutch can include a disengaged state whereby the transmission gearing is uncoupled from the tower shaft.

A further embodiment of any of the foregoing gas turbine engines, wherein the first clutch can include an engaged state whereby the transmission gearing rotationally couples to the tower shaft.

A further embodiment of any of the foregoing gas turbine engines can include a second clutch between the transmission gearing and the second shaft.

A further embodiment of any of the foregoing gas turbine engines, wherein the second clutch can include a disengaged state whereby the transmission gearing is uncoupled from the second shaft.

A further embodiment of any of the foregoing gas turbine engines, wherein the second clutch can include an engaged state whereby the transmission gearing is coupled to the second shaft.

A further embodiment of any of the foregoing gas turbine engines can include a variable area turbine disposed between the first turbine and the third turbine.

A further embodiment of any of the foregoing gas turbine engines, wherein vanes of the variable area turbine are rotatable about respective pivot axes to vary an open area of the variable area turbine.

A further embodiment of any of the foregoing gas turbine engines, wherein a second maximum speed is the maximum continuous rotational speed of the second spool.

A further embodiment of any of the foregoing gas turbine engines, wherein a third maximum speed is the maximum continuous rotational speed of the third spool.

A further embodiment of any of the foregoing gas turbine engines, wherein a gear ratio between the second spool and the third spool is constant and rotates the second spool at the second maximum speed when a third rotational speed of the third spool is equal to or less than 90% of the third maximum speed and greater than or equal to 80% of the third maximum speed.

A further embodiment of any of the foregoing gas turbine engines, wherein the housing of the accessory gearbox can subtend the gas turbine engine about the first spool and the third spool.

A further embodiment of any of the foregoing gas turbine engines, wherein the third shaft can be concentric with the first shaft.

A further embodiment of any of the foregoing gas turbine engines, wherein the second shaft can be offset from the first shaft and the third shaft.

A further embodiment of any of the foregoing gas turbine engines can include a primary combustor communicating with the first compressor and the first turbine.

A further embodiment of any of the foregoing gas turbine engines can include a secondary combustor communicating with the second compressor and the second turbine.

A further embodiment of any of the foregoing gas turbine engines, wherein a primary flow path can include, in flow series, the third compressor, the first compressor, the primary combustor, the first turbine, and the third turbine.

A further embodiment of any of the foregoing gas turbine engines, wherein a secondary flow path includes, in flow series, the second compressor, the secondary combustor, and the second turbine.

A further embodiment of any of the foregoing gas turbine engines, wherein the secondary flow path can intersect the primary flow path between the first compressor and the first turbine.

A further embodiment of any of the foregoing gas turbine engines, wherein the first compressor can be a high pressure compressor and the second compressor can be a low pressure compressor.

A further embodiment of any of the foregoing gas turbine engines, wherein the first turbine can be a high pressure turbine and the second turbine can be a low pressure turbine.

A method of operating a gas turbine engine includes, among other possible things, supplying a first fuel flow rate to a primary combustor of the gas turbine engine contemporaneously with supplying a second fuel flow rate to a secondary combustor of the gas turbine engine based on a power lever angle indicative of a first power subrange of an intermediate power range of the gas turbine engine. The intermediate power range consists of the first power subrange and a second power subrange that is less than a maximum continuous power and greater than a minimum continuous power associated with an operating range of the gas turbine engine.

The method of the preceding paragraph can optionally include, additionally and/or alternatively, any one or more of the following features, configurations, additional components, and/or steps.

A further embodiment of the foregoing method can include disengaging a first clutch uncoupling a tower shaft from an accessory gearbox based on the power lever angle less than the second power subrange.

A further embodiment of any of the foregoing gas turbine engines can include engaging a second clutch coupling a second shaft of a boost spool to an accessory gearbox based on the power lever angle greater than the minimum continuous power up to and including the intermediate power range.

A further embodiment of any of the foregoing gas turbine engines can include supplying a third fuel flow rate of the primary combustor of the gas turbine engine contemporaneously with supplying a fourth fuel flow rate to the secondary combustor of the gas turbine engine based on the power lever angle indicative of the second power subrange of the intermediate power range.

A further embodiment of any of the foregoing gas turbine engines, wherein the third fuel flow rate can vary to maintain a minimum exhaust pressure ratio of the gas turbine engine.

A further embodiment of any of the foregoing gas turbine engines, wherein the fourth fuel flow rate can vary based on the power lever angle indicative of the second power subrange of the intermediate power range.

A further embodiment of any of the foregoing gas turbine engines can include engaging the first clutch coupling the tower shaft to the accessory gearbox based on the power lever angle greater than the first power subrange.

A further embodiment of any of the foregoing gas turbine engines can include supplying the first fuel flow rate to the primary combustor of the gas turbine engine contemporaneously with stopping fuel flow to the secondary combustor based on the power lever angle greater than the second subrange and less than or equal to the maximum continuous power.

A further embodiment of any of the foregoing gas turbine engines, wherein the first fuel flow rate can varies based on the power elver angle.

A further embodiment of any of the foregoing gas turbine engines can include disengaging the second clutch uncoupling the second shaft of the boost spool from the accessory gearbox based on the power elver angle greater than the second power subrange and less than or equal to the maximum continuous power.

A further embodiment of any of the foregoing gas turbine engines can include supplying the second fuel flow rate to the secondary combustor contemporaneously with supplying the third fuel flow rate to the primary combustor based on the power lever angle less than the first power subrange and greater than or equal to the minimum continuous power.

A further embodiment of any of the foregoing gas turbine engines, wherein the second fuel flow rate can vary based on a rotational speed of an accessory gearbox.

A further embodiment of any of the foregoing gas turbine engines, wherein the third fuel flow rate can vary to maintain the minimum exhaust pressure ratio of the gas turbine engine.

A further embodiment of any of the foregoing gas turbine engines can include increasing an open area of a variable area turbine based on the power lever angle indicative of the second power subrange of the intermediate power range.

A further embodiment of any of the foregoing gas turbine engines can include decreasing an open area of the variable area turbine based on the power lever angle greater than the second power subrange and less than or equal to the maximum continuous power.

A further embodiment of any of the foregoing gas turbine engines can include increasing an open area of a variable area turbine based on the power lever angle less than the first power subrange and greater than or equal to the minimum continuous power.

A further embodiment of any of the foregoing gas turbine engines can include decreasing an open area of a variable area turbine based on the power lever angle indicative of the first power subrange.

A further embodiment of any of the foregoing gas turbine engine, wherein the variable area turbine can be disposed between a first turbine and a third turbine of the gas turbine engine.

A further embodiment of any of the foregoing gas turbine engines can include adjusting the open area of the variable area turbine based on the rotational speed of the first turbine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A method of operating a gas turbine engine having an operational power range that includes an intermediate power range consisting of a first power subrange and a second power subrange that is less than a maximum continuous power and greater than a minimum continuous power, the method comprising:
   supplying a first fuel flow rate to a primary combustor of the gas turbine engine contemporaneously with supplying a second fuel flow rate to a secondary combustor of the gas turbine engine based on a power lever angle indicative of the first power subrange of the intermediate power range, wherein:
   the first fuel flow rate varies based on the power lever angle; and
   the second fuel flow rate varies based on a rotational speed of an accessory gearbox, wherein the second fuel flow rate varies to minimize variation of the rotational speed of the accessory gearbox within the first power subrange, towards substantially achieving a constant rotational speed of the accessory gearbox;

disengaging a first clutch uncoupling a tower shaft from the accessory gearbox based on the power lever angle less than the second power subrange; and engaging a second clutch coupling a second shaft of a boost spool to the accessory gearbox based on the power lever angle greater than the minimum continuous power up to and including the intermediate power range;

wherein disengaging the first clutch and engaging the second clutch occur before supplying the first fuel flow rate to the primary combustor and supplying the second fuel flow rate to the secondary combustor.

2. The method of claim 1, further comprising:

supplying a third fuel flow rate to the primary combustor of the gas turbine engine contemporaneously with supplying a fourth fuel flow rate to the secondary combustor of the gas turbine engine based on the power lever angle indicative of the second power subrange of the intermediate power range, wherein:

the third fuel flow rate varies to maintain a minimum exhaust pressure ratio of the gas turbine engine; and the fourth fuel flow rate varies based on the power lever angle indicative of the second power subrange of the intermediate power range; and engaging the first clutch coupling the tower shaft to the accessory gearbox based on the power lever angle greater than the first power subrange.

3. The method of claim 2, further comprising:

supplying the first fuel flow rate to the primary combustor of the gas turbine engine contemporaneously with stopping fuel flow to the secondary combustor based on the power lever angle greater than the second subrange and less than or equal to the maximum continuous power, wherein the first fuel flow rate varies based on the power lever angle.

4. The method of claim 3, further comprising:

disengaging the second clutch uncoupling the second shaft of the boost spool from the accessory gearbox based on the power lever angle greater than the second power subrange and less than or equal to the maximum continuous power.

5. The method of claim 4, further comprising:

supplying the second fuel flow rate to the secondary combustor contemporaneously with supplying the third fuel flow rate to the primary combustor based on the power lever angle less than the first power subrange and greater than or equal to the minimum continuous power, wherein:

the second fuel flow rate varies based on the rotational speed of the accessory gearbox; and the third fuel flow rate varies to maintain the minimum exhaust pressure ratio of the gas turbine engine.

6. The method of claim 5, further comprising:

increasing an open area of a variable area turbine based on the power lever angle less than the first power subrange and greater than or equal to the minimum continuous power, wherein the variable area turbine is disposed between a first turbine and a third turbine of the gas turbine engine.

7. The method of claim 4, further comprising:

decreasing an open area of a variable area turbine based on the power lever angle greater than the second power subrange and less than or equal to the maximum continuous power, wherein the variable area turbine is disposed between a first turbine and a third turbine of the gas turbine engine.

8. The method of claim 2, further comprising:

increasing an open area of a variable area turbine based on the power lever angle indicative of the second power subrange of the intermediate power range, wherein the variable area turbine is disposed between a first turbine and a third turbine of the gas turbine engine.

9. The method of claim 8, further comprising:

adjusting the open area of the variable area turbine based on a rotational speed of the first turbine.

10. The method of claim 1, further comprising:

decreasing an open area of a variable area turbine based on the power lever angle indicative of the first power subrange, wherein the variable area turbine is disposed between a first turbine and a third turbine of the gas turbine engine.

11. The method of claim 1, wherein the second fuel flow rate is varied to maintain the rotational speed of the accessory gearbox constant within the first power subrange.

* * * * *